Dec. 11, 1951     K. B. PALME ET AL     2,578,203
APPARATUS FOR PREDICTING THE LATERAL AND VERTICAL
ANGLES OF THE FUTURE POSITION OF A MOVING
TARGET BY GEOMETRICAL ANALOGUE

Filed May 15, 1947     3 Sheets—Sheet 1

INVENTORS
KARL BERTIL PALME and SVEN GUNNAR GERDIN

BY

ATTORNEY

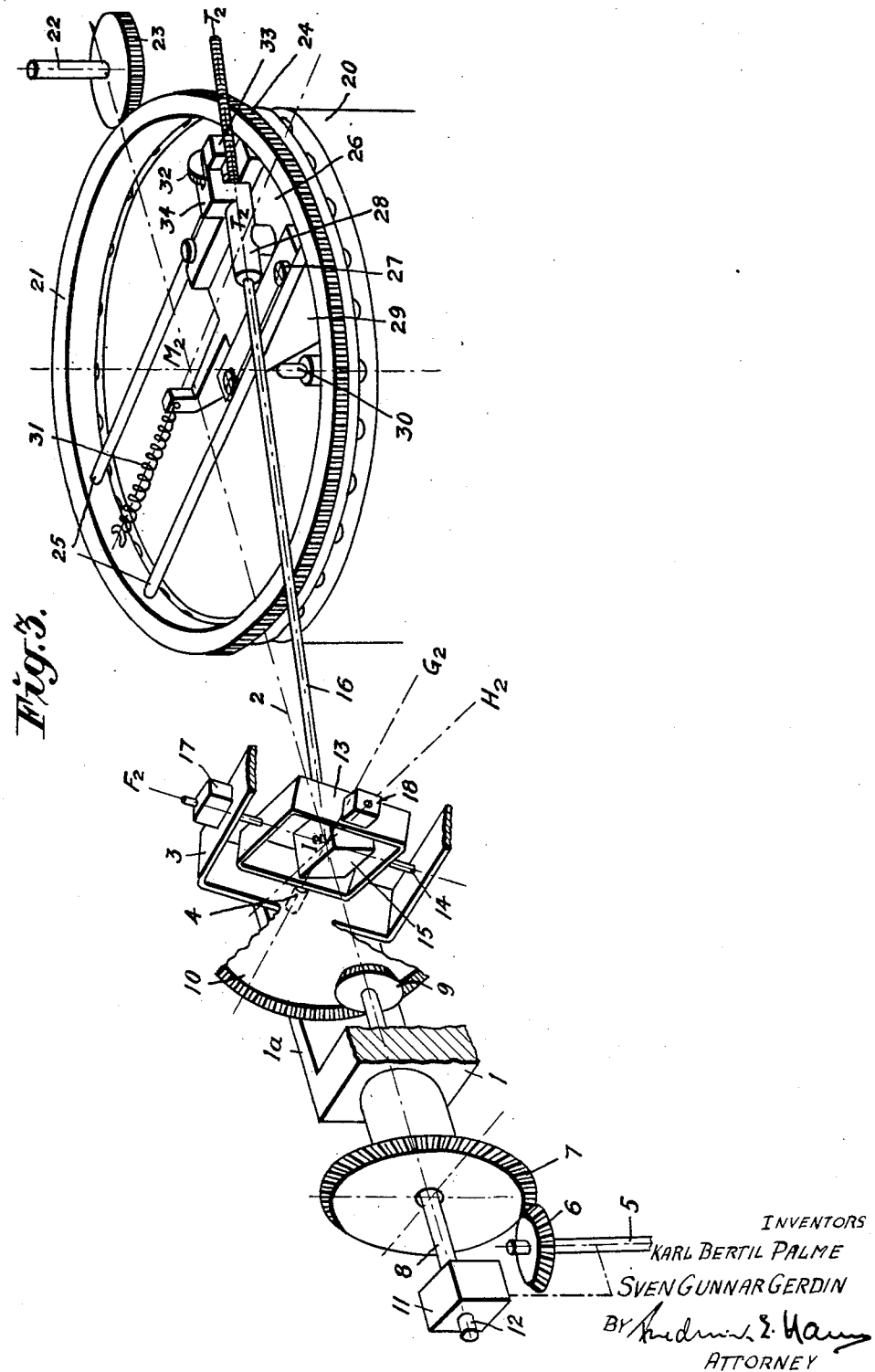

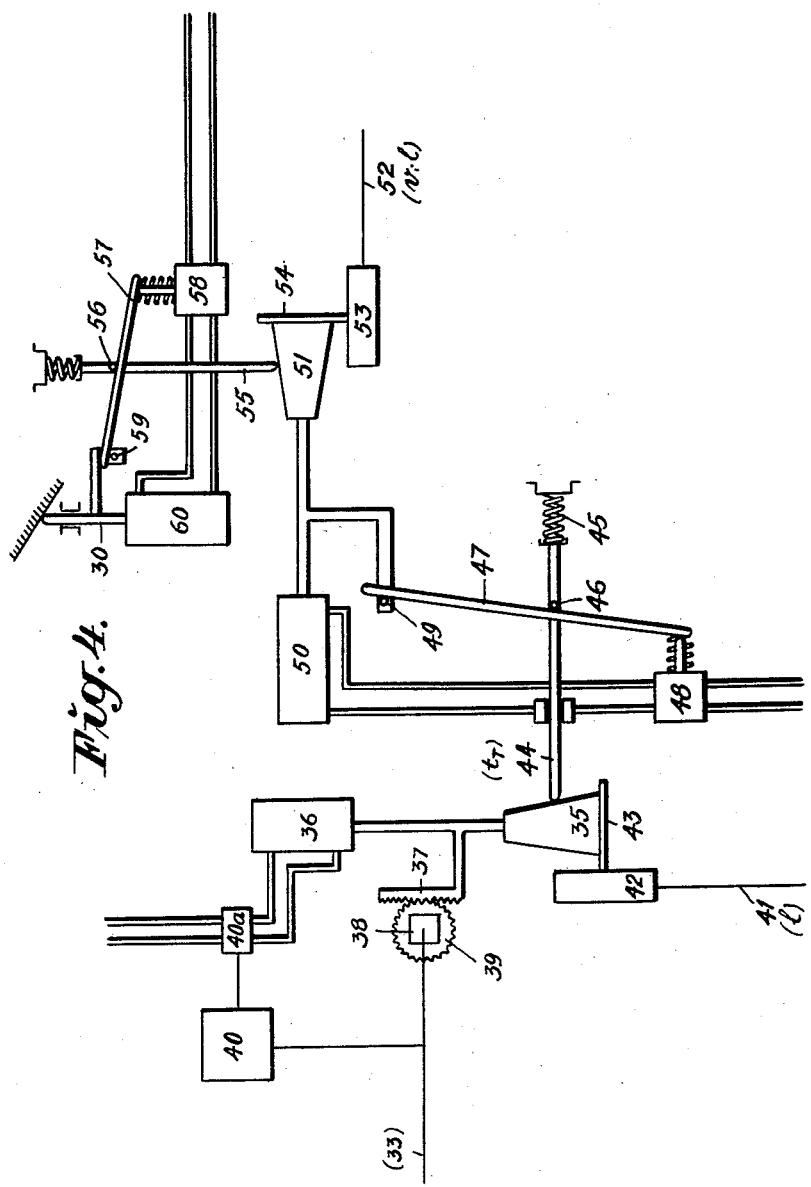

Patented Dec. 11, 1951

2,578,203

UNITED STATES PATENT OFFICE 2,578,203

APPARATUS FOR PREDICTING THE LATERAL AND VERTICAL ANGLES OF THE FUTURE POSITION OF A MOVING TARGET BY GEOMETRICAL ANALOGUE

Karl Bertil Palme and Sven Gunnar Gerdin, Bofors, Sweden

Application May 15, 1947, Serial No. 748,370
In Sweden December 21, 1943

Section 1, Public Law 690, August 8, 1946
Patent expires December 21, 1963

6 Claims. (Cl. 235—61.5)

This invention relates to fire-control instruments, particularly to the means for the continuous determination of the advance point during target tracking by elements which mechanically represent the instrument point, the midpoint and the advance point as well as the connecting lines between these points, further the angles between the distances mentioned, or between those of their components and between these distances and certain fixed directions or planes, where the representation of the distances mentioned or of their components is on a scale inversely proportional to the value of the midpoint distance, whereby the distance representing the midpoint distance obtains a constant length.

One of the objects of the invention is a device in which the elements representing mechanically the position of the instrument point as well as the position of the midpoint are arranged in such a way, that these representative points assume a fixed position in the device.

In comparison with known devices serving the same purpose, a device according to the invention has several advantages. Among others, from a mechanical viewpoint, a rugged construction is attainable. Furthermore, the device possesses a greater simplicity and permits more accurate determinations than the devices of this type as hitherto known.

Other and further objects, features and advantages of the invention will appear hereinafter and be pointed out in the appended claims.

In the accompanying drawings, a now preferred embodiment of the invention is shown by way of illustration and not by way of limitation.

Fig. 3 is a perspective view of an embodiment of the invention, and

Fig. 4 is a diagrammatic view of Fig. 3.

Figure 1:
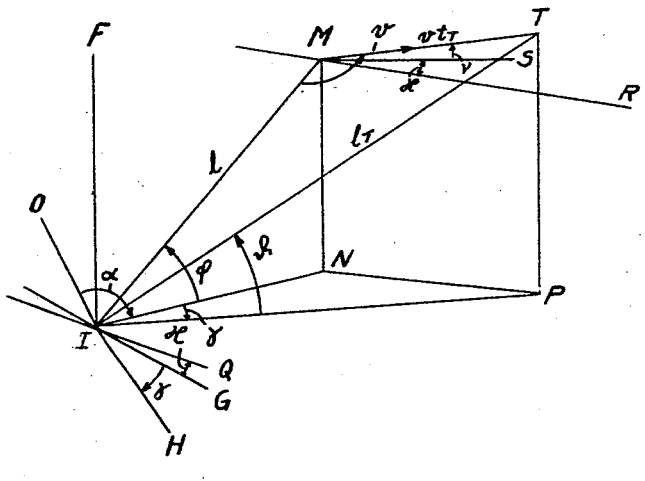
Fig. 1 is a diagram of directions, sections and angles, which are used to explain the principle of an advance point determination for a target moving in space.

Referring now to Fig. 1 in detail. The reference characters of this figure designate:

I—instrument point (i. e. point at which the instrument is set up).
IO—fixed horizontal or azimuth direction.
M—midpoint (target at moment of measuring).
IM—midpoint line (sight line from the instrument to the midpoint.
N—projection of M upon the horizontal or azimuth plane through I.
T—advance point.
IT—line of advance point (sight line from the instrument to the advance point).
MIT—plane of target course. The plane which contains IM, the target course, and IT.
P—projection of T upon the horizontal plane through I.
$MT = vt_T$—section flown by the target during the flight-time of the projectile $t_T$ to the advance point.
$v$—speed of the midpoint.
MR—horizontal straight line, perpendicular to IM, through M.
MS—straight line, perpendicular to IM and lying in MIT-plane.
IF—vertical line, axle of azimuth sight of instrument and gun.
IG—horizontal line, vertical to IM and axle of quadrant sight for the telescopic sights.
IH—horizontal line, vertical to IT and elevation-trunnion-axle of the gun.
IQ—parallel line to MS through I.
$l$—midpoint distance IM.
$a$—angle OIN=deflection angle of midpoint in horizontal plane.
$\varphi$—angle MIN=elevation angle of midpoint.
$\gamma$—angle NIP=horizontal increment to azimuth.
$\vartheta$—angle TIP=elevation angle to the advance point.
$l_T$—distance of advance point IT.
$\kappa$—angle RMS.
$\nu$—angle SMT.

The values $a$, $\varphi$, $l$, $v$ and the angles $\kappa$ and $\nu$, which determine the direction of the midpoint velocity, may represent the measurements taken during the target-tracking for the values of the coordinates and the speed of the midpoint as well as the direction. The values $l$ and $v$ may be substituted through any one simple function of $l$ for example through the ratio $$\frac{v}{l}$$

The target tracking carried out by means of telescopic sights and the range finders and the determination of the above mentioned values found in connection therewith may be accomplished by any appropriate means (conventional or otherwise), as are described in the copending application of Sven Gunnar Gerdin, Ser. No. 731,109, filed February 2, 1947, now Patent No. 2,567,665 issued on September 1, 1951. The values sought for the advance point determination are $\gamma$, $v$ and $t_T$. The flying time $t_T$ can be determined if $l_T$ or a function thereof is known.

Figure 2:
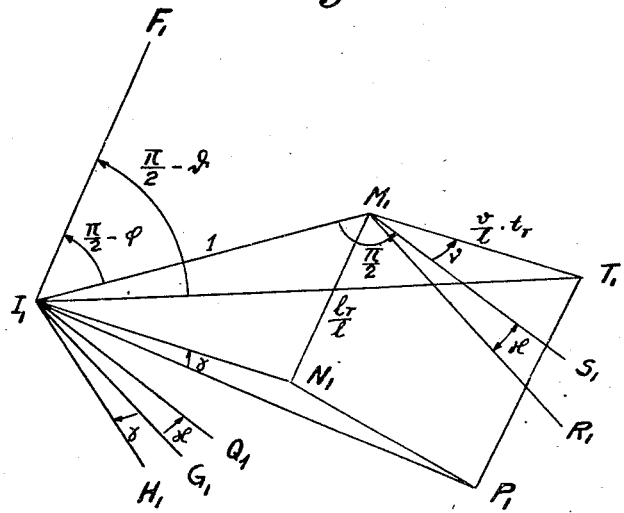
Fig. 2 is a corresponding diagram on a different scale and with other positions of the values, and constitutes the basis for the advance point determination according to the invention.

The principle on which the device according to the invention works, can be simply explained in connection with Figs. 2 and 3. Fig. 2 is a representation of Fig. 1 on a scale $$\frac{1}{l}$$

The points $I_1$, $M_1$ etc. in Fig. 2 correspond to the points I, M etc. in Fig. 1 and to the points $I_2$, $M_2$ in Fig. 3. By means of the scale selected for Fig. 2 it becomes possible to make distance $I_1M_1$ constant, so that $I_1M_1$ can be represented by a fixed distance. That is:

$$M_1T_1 = \frac{\text{speed of the midpoint}}{\text{distance between } I \text{ and } M} \cdot$$

flying time of the midpoint from $M$ to $T$ $$I_1T_1 = \frac{\text{distance between } I \text{ and } T}{\text{distance between } I \text{ and } M}$$

The diagram in Fig. 2 is also obtained from Fig. 1 by two consecutive rotations of the latter into a special position. First, it be assumed that the diagram of Fig. 1 is rotated through the angle $\varphi$ around IG, so that IM becomes horizontal. From this position, the diagram is rotated through the angle $\kappa$ around IM, so that also MS and therewith MT and IT become horizontal. In the position thus obtained, the diagram in Fig. 2 is represented.

It is now apparent, that in Fig. 2 the points $I_1$ and $M_1$ become fixed, and that the distances $M_1T_1$ and $I_1T_1$ lie always in the horizontal plane through $I_1$ and $M_1$, whereby the plane $M_1I_1T_1$ representing the target course plane MIT receives a fixed position. The desired angles $\gamma$ and $\vartheta$ become now the angles $N_1I_1P_1$ resp. $P_1I_1T_1$, the plane $N_1I_1P_1$ in Fig. 2 constituting the obliquely lying representation of the horizontal plane NIP in Fig. 1.

The device according to Fig. 3 comprises a yoke 1 rotatable about an axis 2, two legs of yoke 1 being parallel to axis 2. For clarity's sake only on leg 1a is shown in the figure. Yoke 1 supports a frame 3, which is rotatably mounted on yoke 1 by means of a pivot 4. The axes of rotation of yoke 1 and of frame 3 intersect vertically at the point $I_2$. This point corresponds to the point $I_1$ in Fig. 2. $I_2G_2$ is the axis of rotation of the frame 3 and corresponds to the line $I_1G_1$ in Fig. 2. In frame 3, there is a frame 13 rotatably mounted by means of a pivot 14, whereby the axis of rotation $I_2F_2$ of the frame 13 passes through point $I_2$ and is perpendicular to $I_2G_2$. Finally, there is an element 15 mounted on frame 13, so that its axis of rotation $I_2H_2$ passes through the point $I_2$ and is vertical to the axis $I_2F_2$. Element 15 is rigidly connected with a shaft 16, whose center axis $I_2T_2$ passes through $I_2$ and is vertical to $I_2H_2$. In order that the axes of rotation aforementioned intersect always at one point, to wit $I_2$, pivots 4 and 14 and element 15 must be secured against axial displacement. The lines $I_2F_2$, $I_2T_2$ correspond to the lines $I_1F_1$, $I_1H_1$ and $I_1T_1$ in Fig. 2. According to Fig. 2, line $I_1G_1$, which corresponds to line $I_2G_2$ in Fig. 3, forms the angle $\kappa$ with the horizontal line $I_1Q_1$, vertical to $I_1M_1$. This is made possible for $I_2G_2$ in Fig. 3 by swinging yoke 1 from the position in which the axis of rotation $I_2G_2$ is horizontal for the frame 3, through the angle $\kappa$. This swinging movement is accomplished by means of an axle 5 and a bevel gearing 6, 7.

The point $M_2$ lies on the elongation of the axis of rotation 2 of yoke 1 and must correspond to the point $M_1$ in Fig. 2. The angle $F_2I_2M_2$, which must be equal to the angle $F_1I_1M_1$, i. e. equals $$\frac{\pi}{2} - \varphi$$

is introduced by rotating frame 3 around pivot 4, i. e. $I_2G_2$, by means of an axle 12, a differential gearing 11, an axle 8, and a bevel gear 9, 10. The error of rotation which may develop in gearing 9, 10, when swinging yoke 1, is corrected in differential gear 11.

Let it be now assumed that by means, hereinafter described, point $T_2$ is given the same position in relation to the point $M_2$ as that of point $T_1$ in relation to point $M_1$ in Fig. 2, so that $T_2$ represents exactly $T_1$. The centerline $I_2T_2$ in Fig. 3 then represents the advance point line or line $I_1T_1$ in Fig. 2, and plane $M_2I_2T_2$ represents plane $M_1I_1T_1$ which represents the target course plane. From the above, it appears that the angle $F_2I_2T_2$ equals the angle $F_1I_1T_1$ and hence also $$\frac{\pi}{2} - \theta$$

The axis of rotation $I_2H_2$ is perpendicular to the axis $F_2I_2$ as well as on the line $I_2T_2$ and hence to the plane in which lies the angle $$\frac{\pi}{2} - \theta$$

Therefore, the angle can be measured as an angular rotation about the axis $I_2H_2$. Mounted on the frame 13 is a data transmitter 18, which measures the angle between the element 15, whose position is determined through the position of the shaft 16, i. e. $I_2T_2$, and the frame 13, whose angular position relative to $I_2H_2$ is determined by pivot 14, i. e. the axis $I_2F_2$. The data transmitter 18 can transmit the angle $$\frac{\pi}{2} - \theta$$

electrically to devices, by means of which the quadrant sight arrangement of the gun is adjusted. According to Fig. 2, angle $G_1I_1H_1$ is equal to the increment of the angle of deviation. For the described setting of the angle in the device of Fig. 3, the angle $G_2I_2H_2$ equals the angle $G_1I_1H_1$ and hence also $\gamma$. Both $I_2G_2$ and $I_2H_2$, are perpendicular to the axis $I_2F_2$. The angle $\gamma$ lies hence in a plane, perpendicular to the axis $I_2F_2$ and can therefore be measured as an angular rotation around this axis. A data transmitter 17 measures the angle difference between frame 3, whose angular position relative to the axis $I_2F_2$ is determined by the position of the axis $I_2G_2$, pivot 14 mounted in frame 13. The angular position of pivot 14 relative to axis $I_2F_2$ is determined by the position of $I_2H_2$, and thus also corresponds to the angle $\gamma$. The data transmitter 17 can transmit electrically the azimuth increment $\gamma$ to the azimuth training device of the gun. A cylindrical standard 20 is supported on a base (not shown) opposite to the open side of yoke 1. On this standard, a ring 21 is rotatably mounted so that its axis of rotation is perpendicular to the axis of rotation of yoke 1 and intersects the extension of it in the point $M_2$. Ring 21 carries two symmetrically disposed guide bars 25, the axes of which are located in a plane perpendicularly to the axis of rotation of the ring 21. The guide bars support a slidable carriage 25, which is guided on the guides 25 by means of rollers 27 mounted on carriage 26. On carriage 26, a sleeve 28 is pivotally mounted, so that its axis of rotation is parallel to the axis of rotation of ring 21. The center line of sleeve 28 intersects with the axis of rotation thereof in the point $T_2$ and is perpendicular thereto. The center of sleeve 28 lies in a plane which passes through the point $M_2$ and is perpendicular to the axis of rotation of ring 21. Sleeve 28 constitutes the control means for shaft 15 so that the sleeve axis intersects with point $T_2$. The distance between points $M_2$ and $T_2$, that is, the displacement position of carriage 26 is adjusted by means of a cam plate 29 supported on carriage 26 and an axially displaceable rod 30. The axis of rod 30 coincides with the axis of rotation of ring 21. The semi-spherical upper end of rod 30 is urged against the cam plate 29 by means of a spring 31. Due to the position and arrangement of rod 30, the magnitude of distance $M_2T_2$ becomes independent of the rotational angle of ring 21 and is determined only by the axial position of rod 30. The rotational angle of ring 21 and therewith of the line $M_2T_2$ is set by means of an axle 22, and a gear 23 engaging a toothed rim 24 of ring 21. As a result, by rotation of axle 22 through a given angle one can adjust the angle $I_2M_2T_2$ in such a way that it becomes equal to the angle $I_1M_1T_1$ in Fig. 2, which is $$\frac{\pi}{2}+\nu$$

The setting of this angle is of course made corresponding to the value of the angle $\nu$ observed during the target tracking.

Section $I_2M_2$ of Fig. 3 corresponds to section $I_1M_1$ of Fig. 2 on a given scale. For causing point $T_2$ to be in its proper position, angle $I_2M_2T_2$ must not only be equal to angle $I_1M_1T_1$, but section $M_2T_2$ must also equal section $M_1T_1$ multiplied by the scale used for $I_2M_2$. This is accomplished by axial displacement of rod 30 proportional to section $$M_1T_1 = \frac{v}{l} \cdot t_T$$

wherein the constant of proportionality used for the extent of the displacement of rod 30 is determined by the aforementioned scale and by the wedge angle of plate 29.

Hence, with the devices described, once the product $$\frac{v}{l} \cdot t_T$$

is known, point $T_2$ can be placed in its position in relation to $I_2M_2$. The proper values of the azimuth increment $\gamma$, and the complement angle $$\frac{\pi}{2}-\theta$$

respectively to the angle of elevation of the advance point are then transmitted to the measuring elements 17 and 18.

The required determination of the flying time of the projectile to the advance point is attained by the following means. Sleeve 28 supports a bracket 34, in which a gear or worm 32 is rotatably mounted. This gear meshes continuously with a rack on shaft 16 and is thus placed in an angular position relative to sleeve 28, which corresponds to distance $T_2I_2$. The rotational angle of gear 32 and therewith the distance $T_2I_2$, which latter is proportional to $$\frac{l_T}{l}$$

on the scale used for the device, is measured by means of a data transmitter 33 fastened to bracket 34.

Fig. 4 shows the devices for the determination of the projectile flying time $t_T$ as well as those for the determination of the product $$\frac{v}{l} \cdot t_T$$

A rotatably mounted curved member 35 shown in Fig. 4 is always maintained at a distance from a given initial position which distance corresponds to the valve $$\frac{l_T}{l}$$

as measured by means of the transmitter 33. For this purpose, member 35 is displaced by a hydraulically operated piston means 36. Member 35 supports a rack 37, which engages a worm or gear 39 fastened to a data transmitter 38 in such a way, that the rotational angle of data transmitter 38 corresponds to the displacement position of member 35. Any angle difference appearing between the data transmitters 33 and 38 is transferred to a relay arrangement 40, which controls a hydraulic valve 40a, which in turn regulates the oil supply to the piston means 36 in such a way, that the movement of the latter reduces the angle difference above mentioned to zero, whereupon equilibrium is attained. Member 35 is rotated proportionally to the value $l$ or a function thereof by means of an axle 41, a worm 42, and a gear 43. The configuration of member 35 is selected so that a detector-pin 44, which is continuously pressed against the surface of member 35 by means of a spring 45, is displaced in a position corresponding to the value $t_T$, which is correct with the values set for $l$ and $$\frac{l_T}{l}$$

for the artillery gun to be serviced and for its ammunition. By means of a lever 47, abutting against a nose 46 extending from pin 44 and a nose 49 displaceable by a piston means 50 together with a curved member 51 and by means of a hydraulic valve 48 adjustable by means of lever 47, piston 50 is caused to displace member 51 on a scale proportional to the displacement of pin 44. In other words, member 51 is placed in a position proportional to $t_2$. By means of an axle 52, a worm 53 and a gear 54, member 51 is further rotated through an agle proportional to the value of $$\frac{v}{l}$$

obtained by the observations. The configuration of member 51 is selected so that a detector pin 55 receives a displacement proportional to $$\frac{v}{l} \cdot l_T$$

By a nose 56 on pin 55, a lever 57 engaged by nose 56, a valve 58, a nose 59 and a hydraulically operated piston 60 constructed similarly to the corresponding elements 46, 47, 48, 49 and 50, rod 30 is displaced proportional to $$\frac{v}{l} \cdot t_T$$

with a constant of proportionality. This constant receives the proper value for the adjustment of the line $M_2T_2$ in Fig. 3 by appropriate selection of the scale of member 51 and the gear ratio of lever 57.

The devices shown in Figs. 3 and 4 constitute a computing apparatus, which adjusts itself automatically for such a value of $t_T$ that for the measured values of $v$ and $l$ and $$\frac{v}{l}$$

respectively, which are transmitted from the outside through the axles 32, 41 and 52 to the apparatus, value $$\frac{l_T}{l}$$

corresponds to a $t_T$ value, which latter equals the one used for the determination of $$\frac{v}{l} \cdot t_T$$

that is, a distance, which enters as a determining factor in the existing value of $$\frac{l_T}{l}$$

The previous description relates only to one now preferred embodiment of the invention. Many changes can be made without departing from the scope of the invention. For example, the hydraulic piston means 36, 50 and 60 may be substituted by rotating motors controlled by the detector pins. These motors then adjust the individual elements by means of devices including screws and nuts. When adjusting carriage 26, the cam plate 29 may be substituted by a device with a screw and nut arrangement wherein the screw is rotated by way of a differential gear, which corrects the error of rotation caused by the rotation of ring 21. Data transmitters 17, 18, 33 and 38 may be of the type and design described in United States Letters Patent 2,147,423.

The above described embodiment of the invention, is based on the assumption that the speed of the midpoint is represented by its magnitude and angular position in the target course plane. However, the invention can also be applied to different conditions for the representation of the midpoint speed. For instance, the midpoint speeds may be represented through two rectangular components in the target course plane one of which is located along the midpoint line and the other perpendicular thereto. The devices of Figs. 3 and 4 for the determination of the point $T_2$ must then be appropriately changed, as will be obvious to a person skilled in the art.

While the invention has been described in detail with respect to a certain now preferred example and embodiment of the invention it will be understood by those skilled in the art after understanding the invention, that various changes and modifications may be made without departing from thespirit and scope of the invention and it is intended therefore, to cover all such changes and modifications in the appended claims.

What is claimed as new and desired to be secured by Letters Patent is:

1. For use in fire control devices, an apparatus for predicting the lateral angle and the vertical angle of the future position of a moving target the movements of which are measured in a slant plane defined by the point of observation and the observed and future target positions, said apparatus comprising a first frame mounted on a base of the apparatus representative of such slant plane and rotatable about an axis positioned in the plane of said first frame, means for turning said first frame an angle $\kappa$ equal to the angle of inclination of the target path from its horizontal position in said slant plane, a second frame mounted on said first frame rotatably about an axis positioned in the plane of said first frame and perpendicular to the axis of said first frame, means for turning said second frame through an angle $\varphi$ equal to the target elevation angle in a plane perpendicular to the plane of said first frame, a third frame mounted on said second frame rotatably about an axis positioned in the plane of said second frame and intersecting the axis of said first frame and defining a point in the slant plane representing the observation point, a rod, one end of said rod being positioned at said intersecting point and rotatably mounted on said third frame about an axis in the plane of said third frame, a carriage supporting the other end of said rod, said rod and carriage being movable in the said slant plane having a fixed position in said apparatus, and means for positioning said carriage in accordance with the predicted future position of the target.

2. An apparatus as defined in claim 1, in combination with an element 15 rotatably mounted on said third frame in a position in which the axis of rotation ($I_2H_1$) of said element is vertical to the axis of rotation ($I_2$, $F_2$) of the third frame and passes through the aforesaid point of intersection between the axes of the third frame and the first frame, and wherein the said element is secured to the said rod for movement in unison therewith.

3. An apparatus as defined in claim 1, in further combination with independent adjustment and drive means for independently varying the angular position of the first and the second frame respectively, the said means including gear means operatively connected with the respective frames.

4. An apparatus as defined in claim 3, in further combination with first data transmitting means supported on said third frame and measuring the angle between the latter frame and said element, the angular position of the latter element being controlled by said rod, second data transmitting means supported on the second frame and adapted to measure the angle between the said frame and the axis of the third frame, third data transmitting means supported on the carriage, and gear means in operative engagement with said rod and said third data transmitting means, said gear means being rotated by said rod and arranged to transmit said rotation to said third data transmitting means.

5. An apparatus as defined in claim 4, in combination with additional data transmitting means and control means for controlling said additional transmitting means by the third data transmitting means, said control means comprising cam and lever means varying the position of one of said additional and third data transmitting means in response to a displacement of the other of the said data transmitting means.

6. An apparatus as defined in claim 1, in combination with a support structure, a ring member supported on said structure rotatable about an axis perpendicular to the rotational axis of said first frame and positioned in alignment therewith, guide means mounted on said ring member in a plane perpendicularly to the rotational axis of the ring member, said guide means slidably supporting said carriage, and adjustment and drive means for varying the angular position of said ring member.

KARL BERTIL PALME.
    SVEN GUNNAR GERDIN.

REFERENCES CITED

The following references are of record in the file of this patent:

UNITED STATES PATENTS

| Number | Name | Date |
|---|---|---|
| 1,997,303 | Le Prieur et al. | Apr. 9, 1935 |
| 2,442,383 | Stewart | June 1, 1948 |

FOREIGN PATENTS

| Number | Country | Date |
|---|---|---|
| 631,795 | Germany | July 1, 1936 |
| 634,862 | Germany | Sept. 5, 1936 |